(12) United States Patent
Khalfan (10) Patent No.: US 12,340,371 B2
(45) Date of Patent: Jun. 24, 2025

(54) SYSTEMS AND METHODS TO ADJUST IN-VEHICLE CONTENT BASED ON DIGITAL ASSETS

(71) Applicant: Disney Enterprises, Inc., Burbank, CA (US)

(72) Inventor: Alif Khalfan, Redwood City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 391 days.

(21) Appl. No.: 17/876,199

(22) Filed: Jul. 28, 2022

(65) Prior Publication Data

US 2023/0036724 A1    Feb. 2, 2023

Related U.S. Application Data

(60) Provisional application No. 63/226,416, filed on Jul. 28, 2021.

(51) Int. Cl.
G06Q 20/40        (2012.01)
G06Q 20/32        (2012.01)
(Continued)

(52) U.S. Cl.
CPC ..... *G06Q 20/40145* (2013.01); *G06Q 20/321* (2020.05); *G06Q 20/34* (2013.01);
(Continued)

(58) Field of Classification Search
None
See application file for complete search history.

(56) References Cited

U.S. PATENT DOCUMENTS 1,004,331 A    9/1911    Wright
1,004,624 A    10/1911   Brann
(Continued)

FOREIGN PATENT DOCUMENTS

CN    113193965 B    10/2021
IN    1381KOL2007    4/2009
(Continued)

OTHER PUBLICATIONS

Manzoor et al, "Scavenger Hunt: Utilization of Blockchain and IoT for a Location-Based Game," 2020, IEEE. Retrieved from <https://ieeexplore.ieee.org/stamp/stamp.jsp?tp=&arnumber=9253568&tag=1> on Oct. 18, 2024. (Year: 2020).*
(Continued)

*Primary Examiner* — Jamie R Kucab
(74) *Attorney, Agent, or Firm* — Esplin & Associates, PC (57) ABSTRACT

System and method to adjust in-vehicle content based on digital assets are described herein. Exemplary implementations include: receive authentication information for a user; determine whether the authentication information is valid; determine, responsive to determination that the authentication information is valid, a set of one or more digital assets that are associated with an address included in a digital wallet of the user based on transactions recorded on a decentralized ledger such that the user owns the set of the one or more digital assets, wherein the transactions includes the address and the set of the one or more digital assets, wherein the digital wallet includes a private key that provides the user with access to consideration sent to the address; determine a set of one or more content correlated to the set of the one or more digital assets, wherein the content is stored in electronic storage; and adjust in-vehicle content based on the one or more digital assets and the correlated set of one or more content.

16 Claims, 3 Drawing Sheets

(51) Int. Cl.
*G06Q 20/34* (2012.01)
*G06Q 20/36* (2012.01)
*G06Q 20/38* (2012.01)

(52) U.S. Cl.
CPC ......... *G06Q 20/36* (2013.01); *G06Q 20/3829* (2013.01); *G06Q 2220/00* (2013.01)

(56) References Cited

U.S. PATENT DOCUMENTS

| | | |
|---|---|---|
| 5,299,291 A | 3/1994 | Ruetz |
| 5,766,077 A | 6/1998 | Hongo |
| 6,007,338 A | 12/1999 | Dinunzio |
| 6,053,815 A | 4/2000 | Hara |
| 6,200,138 B1 | 3/2001 | Ando |
| 6,691,032 B1 | 2/2004 | Irish |
| 7,081,033 B1 | 7/2006 | Mawle |
| 7,266,847 B2 | 9/2007 | Pauker |
| 7,739,371 B2 | 6/2010 | Ikegaya |
| 7,837,544 B2 | 11/2010 | Tipping |
| 8,078,163 B2 | 12/2011 | Lemond |
| 8,190,295 B1 | 5/2012 | Garretson |
| 8,758,126 B2 | 6/2014 | Bavitz |
| 8,762,227 B1 | 6/2014 | Fox |
| 8,831,228 B1 | 9/2014 | Agrawal |
| 8,882,595 B2 | 11/2014 | Chowdhary |
| 8,894,462 B2 | 11/2014 | Leyland |
| 8,941,690 B2 | 1/2015 | Seder |
| 8,948,541 B2 | 2/2015 | Neville |
| 8,988,465 B2 | 3/2015 | Baron |
| 9,007,400 B2 | 4/2015 | Takahashi |
| 9,008,310 B2 | 4/2015 | Nelson |
| 9,266,018 B2 | 2/2016 | Story |
| 9,293,042 B1 | 3/2016 | Wasserman |
| 9,327,189 B2 | 5/2016 | Bavitz |
| 9,361,730 B2 | 6/2016 | Keating |
| 9,467,515 B1 | 10/2016 | Penilla |
| 9,610,510 B2 | 4/2017 | Comploi |
| 9,643,086 B2 | 5/2017 | Tipping |
| 9,669,302 B2 | 6/2017 | Park |
| 9,674,361 B2 | 6/2017 | Ristock |
| 9,715,764 B2 | 7/2017 | Alaniz |
| 9,744,448 B2 | 8/2017 | Mullen |
| 9,814,991 B2 | 11/2017 | Van Winkle |
| 9,818,228 B2 | 11/2017 | Lanier |
| 9,821,920 B2 | 11/2017 | Cole |
| 9,922,466 B2 | 3/2018 | Donnelly |
| 10,019,070 B2 | 7/2018 | Szczerba |
| 10,025,431 B2 | 7/2018 | Li |
| 10,043,316 B2 | 8/2018 | Donnelly |
| 10,043,999 B2 | 8/2018 | Senoo |
| 10,045,147 B2 | 8/2018 | Dickow |
| 10,046,241 B1 | 8/2018 | Krosky |
| 10,059,347 B2 | 8/2018 | Thieberger-Navon |
| 10,123,155 B2 | 11/2018 | Grover |
| 10,140,464 B2 | 11/2018 | Lebeck |
| 10,162,998 B2 | 12/2018 | Park |
| 10,186,065 B2 | 1/2019 | Anderson |
| 10,310,600 B2 | 6/2019 | Hong |
| 10,339,711 B2 | 7/2019 | Ng-Thow-Hing |
| 10,366,290 B2 | 7/2019 | Wang |
| 10,376,776 B2 | 8/2019 | Lowe |
| 10,423,999 B1 | 9/2019 | Doctor |
| 10,482,669 B2 | 11/2019 | Rober |
| 10,501,053 B2 | 12/2019 | Tokunaga |
| 10,506,092 B1 | 12/2019 | Stephenson |
| 10,572,123 B2 | 2/2020 | Penilla |
| 10,585,471 B2 | 3/2020 | Reichow |
| 10,589,625 B1 | 3/2020 | Goslin |
| 10,639,557 B2 | 5/2020 | Hake |
| 10,785,621 B1 | 9/2020 | Drake |
| 10,841,632 B2 | 11/2020 | Chao |
| 10,969,748 B1 | 4/2021 | Goslin |
| 10,970,560 B2 | 4/2021 | Khalfan |
| 11,076,276 B1 | 7/2021 | Nocon |
| 11,228,436 B1 * | 1/2022 | Foley ................. G06F 21/10 |
| 11,251,978 B2 * | 2/2022 | Ingraham ................. H04L 9/085 |
| 11,369,878 B1 | 6/2022 | Koch |
| 11,605,062 B2 | 3/2023 | Prakash |
| 2001/0025287 A1 | 9/2001 | Okabe |
| 2003/0027636 A1 | 2/2003 | Covannon |
| 2003/0104824 A1 | 6/2003 | Hale |
| 2003/0130031 A1 | 7/2003 | Yoshida |
| 2004/0059922 A1 | 3/2004 | Harris |
| 2005/0021192 A1 | 1/2005 | Takafuji |
| 2005/0059483 A1 | 3/2005 | Borge |
| 2005/0144091 A1 | 6/2005 | Harper |
| 2006/0052153 A1 | 3/2006 | Vlazny |
| 2006/0143270 A1 | 6/2006 | Wodtke |
| 2006/0224456 A1 | 10/2006 | Walker |
| 2006/0277100 A1 | 12/2006 | Parham |
| 2007/0060233 A1 | 3/2007 | Liccardo |
| 2007/0087834 A1 | 4/2007 | Moser |
| 2007/0093299 A1 | 4/2007 | Bergeron |
| 2007/0139671 A1 | 6/2007 | Stevens |
| 2007/0197275 A1 | 8/2007 | Gagner |
| 2007/0206023 A1 | 9/2007 | Street |
| 2008/0091782 A1 | 4/2008 | Jakobson |
| 2008/0105751 A1 | 5/2008 | Landau |
| 2008/0148067 A1 | 6/2008 | Sitrick |
| 2008/0200244 A1 | 8/2008 | Rowe |
| 2008/0309010 A1 | 12/2008 | Bowling |
| 2008/0311983 A1 | 12/2008 | Koempel |
| 2009/0069084 A1 | 3/2009 | Reece |
| 2009/0079705 A1 | 3/2009 | Sizelove |
| 2009/0137323 A1 | 5/2009 | Fiegener |
| 2009/0176566 A1 | 7/2009 | Kelly |
| 2009/0313358 A1 | 12/2009 | Shepherd |
| 2010/0033427 A1 | 2/2010 | Marks |
| 2010/0093421 A1 | 4/2010 | Nyman |
| 2010/0098092 A1 | 4/2010 | Luo |
| 2010/0130296 A1 | 5/2010 | Ackley |
| 2010/0182340 A1 | 7/2010 | Bachelder |
| 2010/0268661 A1 | 10/2010 | Levy |
| 2010/0324984 A1 | 12/2010 | Pelto |
| 2010/0331721 A1 | 12/2010 | Epley |
| 2011/0098092 A1 | 4/2011 | Reiche, III |
| 2011/0183754 A1 | 7/2011 | Alghamdi |
| 2011/0216948 A1 | 9/2011 | Yalla |
| 2012/0089275 A1 | 4/2012 | Yao-Chang |
| 2012/0142415 A1 | 6/2012 | Lindsay |
| 2012/0256945 A1 | 10/2012 | Kidron |
| 2012/0264518 A1 | 10/2012 | Rouille |
| 2012/0289122 A1 | 11/2012 | Elliott |
| 2012/0295703 A1 | 11/2012 | Reiche |
| 2012/0295704 A1 | 11/2012 | Reiche |
| 2013/0030645 A1 | 1/2013 | Divine |
| 2013/0083003 A1 | 4/2013 | Perez |
| 2013/0083061 A1 | 4/2013 | Mishra |
| 2013/0157607 A1 | 6/2013 | Paek |
| 2013/0166147 A1 | 6/2013 | Chudzinski |
| 2013/0274024 A1 | 10/2013 | Geylik |
| 2013/0296058 A1 | 11/2013 | Leyland |
| 2014/0067208 A1 | 3/2014 | Klappert |
| 2014/0100020 A1 | 4/2014 | Carroll |
| 2014/0100029 A1 | 4/2014 | Reiche |
| 2014/0128144 A1 | 5/2014 | Bavitz |
| 2014/0128145 A1 | 5/2014 | Hwang |
| 2014/0129640 A1 | 5/2014 | Ogawa |
| 2014/0162785 A1 | 6/2014 | Reiche |
| 2014/0163771 A1 | 6/2014 | Demeniuk |
| 2014/0189017 A1 | 7/2014 | Prakash |
| 2014/0201004 A1 | 7/2014 | Parundekar |
| 2014/0274313 A1 | 9/2014 | Bala |
| 2014/0295963 A1 | 10/2014 | Ishikawa |
| 2014/0342790 A1 | 11/2014 | Kim |
| 2015/0003609 A1 | 1/2015 | Nelson |
| 2015/0024852 A1 | 1/2015 | Pacey |
| 2015/0065237 A1 | 3/2015 | Hohn |
| 2015/0080125 A1 | 3/2015 | Andre |
| 2015/0097860 A1 | 4/2015 | Alaniz |
| 2015/0097864 A1 | 4/2015 | Alaniz |
| 2015/0100179 A1 | 4/2015 | Alaniz |
| 2015/0134371 A1 | 5/2015 | Shivakumar |
| 2015/0145671 A1 | 5/2015 | Cohen |

(56) References Cited

U.S. PATENT DOCUMENTS

| | | |
|---|---|---|
| 2015/0174479 A1 | 6/2015 | Reiche |
| 2015/0202962 A1 | 7/2015 | Habashima |
| 2015/0269780 A1 | 9/2015 | Herman |
| 2015/0294505 A1 | 10/2015 | Atsmon |
| 2015/0339910 A1 | 11/2015 | Stenzler |
| 2015/0346722 A1 | 12/2015 | Herz |
| 2015/0363092 A1 | 12/2015 | Morton |
| 2016/0005070 A1 | 1/2016 | Burr |
| 2016/0042607 A1 | 2/2016 | McCoy |
| 2016/0071397 A1 | 3/2016 | Logan |
| 2016/0096114 A1 | 4/2016 | Van Winkle |
| 2016/0189444 A1 | 6/2016 | Madhok |
| 2016/0199730 A1 | 7/2016 | Olson |
| 2016/0206955 A1 | 7/2016 | Goslin |
| 2016/0206957 A1 | 7/2016 | Goslin |
| 2016/0216854 A1 | 7/2016 | McClellan |
| 2016/0224939 A1 | 8/2016 | Chen |
| 2016/0299567 A1 | 10/2016 | Crisler |
| 2016/0310839 A1 | 10/2016 | Leyland |
| 2016/0313792 A1 | 10/2016 | Siegel |
| 2016/0346704 A1 | 12/2016 | Wagner |
| 2017/0021273 A1 | 1/2017 | Rios |
| 2017/0021282 A1 | 1/2017 | Comploi |
| 2017/0045946 A1 | 2/2017 | Smoot |
| 2017/0050743 A1 | 2/2017 | Cole |
| 2017/0068311 A1 | 3/2017 | Evans |
| 2017/0072316 A1 | 3/2017 | Finfter |
| 2017/0078621 A1 | 3/2017 | Sahay |
| 2017/0103571 A1 | 4/2017 | Beaurepaire |
| 2017/0106288 A1 | 4/2017 | Reiche |
| 2017/0132334 A1 | 5/2017 | Levinson |
| 2017/0154024 A1 | 6/2017 | Subramanya |
| 2017/0158023 A1 | 6/2017 | Stevanovic |
| 2017/0166221 A1 | 6/2017 | Osterman |
| 2017/0203205 A1 | 7/2017 | Nelson |
| 2017/0236130 A1 | 8/2017 | Kee |
| 2017/0236328 A1 | 8/2017 | Eatedali |
| 2017/0253252 A1 | 9/2017 | Donnelly |
| 2017/0270502 A1 | 9/2017 | Finbow |
| 2017/0300999 A1 | 10/2017 | Wilkinson |
| 2017/0330034 A1 | 11/2017 | Wang |
| 2017/0344754 A1 | 11/2017 | Kumar |
| 2017/0352185 A1 | 12/2017 | Bonilla Acevedo |
| 2018/0008894 A1 | 1/2018 | Sack |
| 2018/0011988 A1 | 1/2018 | Ziegler |
| 2018/0040162 A1 | 2/2018 | Donnelly |
| 2018/0040163 A1 | 2/2018 | Donnelly |
| 2018/0043272 A1 | 2/2018 | Van Winkle |
| 2018/0089900 A1 | 3/2018 | Rober |
| 2018/0089901 A1 | 3/2018 | Rober |
| 2018/0096501 A1 | 4/2018 | Anderson |
| 2018/0181412 A1 | 6/2018 | Paratey |
| 2018/0231973 A1 | 8/2018 | Mattingly |
| 2018/0247352 A1 | 8/2018 | Rogers |
| 2018/0247364 A1 | 8/2018 | Nakadai |
| 2018/0342001 A1 | 11/2018 | Chavarria |
| 2018/0369702 A1 | 12/2018 | Hake |
| 2019/0001987 A1 | 1/2019 | Kim |
| 2019/0014070 A1 | 1/2019 | Mertvetsov |
| 2019/0047498 A1 | 2/2019 | Alcaidinho |
| 2019/0065970 A1 | 2/2019 | Bonutti |
| 2019/0075437 A1 | 3/2019 | Shaikh |
| 2019/0101976 A1 | 4/2019 | Reichow |
| 2019/0157607 A1 | 5/2019 | Kim |
| 2019/0220674 A1 | 7/2019 | Khalfan |
| 2019/0299105 A1 | 10/2019 | Knight |
| 2019/0385213 A1 | 12/2019 | Pande |
| 2020/0005284 A1 | 1/2020 | Madhu |
| 2020/0053400 A1 | 2/2020 | Chao |
| 2020/0074181 A1 | 3/2020 | Chang |
| 2020/0151768 A1 | 5/2020 | Dekeyser |
| 2020/0163616 A1 | 5/2020 | Sakaya |
| 2020/0193163 A1 | 6/2020 | Chang |
| 2020/0376387 A1 | 12/2020 | Packin |
| 2021/0016184 A1 | 1/2021 | Kalama |
| 2021/0056762 A1 | 2/2021 | Robbe |
| 2021/0217026 A1 | 7/2021 | Hassani |
| 2021/0256070 A1 | 8/2021 | Bao |
| 2021/0284088 A1 | 9/2021 | Yamaguchi |
| 2021/0287195 A1 | 9/2021 | Prakash |
| 2022/0004600 A1 | 1/2022 | Bangole |
| 2022/0069996 A1 | 3/2022 | Xue |
| 2022/0148268 A1 | 5/2022 | Yilanci |
| 2022/0248072 A1 | 8/2022 | Gupta |
| 2022/0258059 A1 | 8/2022 | Murcin |
| 2022/0266148 A1 | 8/2022 | Koch |
| 2023/0052381 A1 | 2/2023 | Khalfan |
| 2023/0071913 A1* | 3/2023 | Kim .................. H04L 9/32 |
| 2023/0142101 A1 | 5/2023 | Hirasawa |
| 2024/0152909 A1 | 5/2024 | Khalfan |

FOREIGN PATENT DOCUMENTS

| | | |
|---|---|---|
| JP | 2019065430 | 4/2019 |
| WO | 2007101785 A1 | 9/2007 |
| WO | 2018128946 A1 | 7/2018 |

OTHER PUBLICATIONS

Holoride, "Adding Thrill to Every Ride" Conceptual Litepaper V.2.1; https://maiarlaunchpad.com/holoride_Litepaper_V2.1_Nov21.pdf; Nov. 2021 (26 pages).

IBM Institute for Business Value, "Blockchain for mobility services" https://www.ibm.com/downloads/cas/M8AOGADZ ; Jan. 2018 (8 pages).

Adam Hartley, 5 Predictions for the Future of in-Car Entertainment, Apr. 9, 2019 [https://360.here.com/5-predictions-for-the-future-of-in-car-leisure-entertainment], (5 pages).

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hacking [retrieved on Nov. 12, 2014] (8 pgs).

Kloster, Benjamin, 'Wanted: Encryption Scheme for Copy Protection Purposes', Retrieved from the Internet http://stackoverflow.com/questions/14529732/wanted-encryption-scheme-for-copy-protection-purposes, Jan. 25, 2013, XP055152568, 2 pages.

Dagamant, 'Skylanders Hacking', Retrieved from the Internet http://web.archive.ora/web/20120309212642/http://www.suncries.com/skvlaners-hacking Feb. 27, 2012, XP055152538, 8 pages.

Extended European Search Report issued in European Patent Application No. 14175300.4, dated Nov. 19, 2014. (6 pgs).

"Video Game/ Battle Circuit", TV Tropes, available at «https://web.archive.org/web/20150114005112/http://tvtropes.org/pmwiki/pmwiki.php/VideoGameBattleCircuit»> (4 pages).

"Battle Circuit", Capcom, available at «https://web.archive.org/web/20000111073021/http://www.capcom.co.jp/newproducts/arcade/battle/bs-top. html>> (Orig in al Japanese web page followed by English translation), 4 pages.

Apple (Developing Wireless CarPlay System, https://developer.apple.com/videos/play/wwdc2017/717/WWDC 2017, video and slide). (Year: 2017).

NPX "Software-Apple-Carplay: Software Technology for CarPlay", https://www.nxp.com/design/software/embedded-software/software-technology-for-carplay:SOFTWARE-APPLE-CARPLAY (Year: 2020), 3 pages.

Google search "Iphone Figurine" (Year: 2020), 1 page.

Dobbins et al. "Creating Human Digital Memories for a Richer Recall of Life Experiences" 2013 10th IEEE Internaional Conference on Networking, Sensing and Control, pp. 246-251 (Year: 2013).

(56) References Cited

OTHER PUBLICATIONS

Olsson et al. "User-Centered Design of a Mobile Application for Sharing Life Memories," Proceedings of the 4th international conference on mobile technology, applications, and systems and the 1st international symposium on Computer human interaction in mobile technology—Mobility '07, pp. 524-531, (Year: 2007).
"Dubai parks, etisalat to create an integrated smart theme park"; Gulf News; Jan. 13, 2016 (2 pages).
"Dynamic NFTs for each player in the 2022 NBA Playoffs"; The Association NFT; https://theassociationnft.com/#/ ; 2022 (5 pages).
"The Aeternals: New NFT and Interactive Technology"; Business Wire; Mar. 2, 2022 (3 pages).
"What is a dynamic NFT"; Chainlink; https://blog.chain.link/what-is-a-dynamic-nft/ ; Apr. 7, 2022 (10 pages).
Adelyn Zhou; "The Next Wave of NFTs will be Dynamic"; Nasdaq; Mar. 29, 2021 (8 pages).
Charlotte Coates; "NFTs: the next big thing for the attractions industry"; Sep. 21, 2021 (14 pages).
Cory Himel; "Developers can use gamification"; Gigster, Mar. 16, 2022 (5 pages).
Lucas Caciolo; "Decentralized theme parks promise kids virtual prizes to earn as they learn"; forkast; Jun. 29, 2021 (4 pages).

\* cited by examiner

SYSTEMS AND METHODS TO ADJUST IN-VEHICLE CONTENT BASED ON DIGITAL ASSETS

CROSS-REFERENCE TO RELATED APPLICATIONS

This application claims priority benefit of the U.S. Provisional Patent Application No. 63/226,416, titled, "SYSTEMS AND METHODS TO ADJUST IN-VEHICLE CONTENT BASED ON NON-FUNGIBLE TOKENS," filed on Jul. 28, 2021. The subject matter of this related application is hereby incorporated herein by reference.

FIELD OF THE DISCLOSURE

The present disclosure relates to systems and methods to adjust in-vehicle content based on digital assets.

BACKGROUND

Users may own a plurality of digital assets, such as non-fungible tokens. Proof of ownership of the digital assets may not present immediate benefits that the users or other users around them can tangibly experience.

SUMMARY OF THE INVENTION

System(s) and method(s) to adjust in-vehicle content based on digital assets are described herein. The digital assets may be maintained by decentralized ledger(s), thereby recording ownership of the digital assets and entities they are correlated with. Furthermore, such ownership may be immutable unless owners of the digital assets initiate transactions to change the ownership and such transactions are recorded on the decentralized ledger. Given that the digital assets may cause adjustments to in-vehicle content, only the owners of the digital assets may cause the adjustments that are based on the digital assets they own. Thus, individual users/owners may cause tangible and/or visual experiences by way of their digital assets. The system may include one or more hardware processors configured by machine-readable instructions. The machine-readable instructions may include one or more instruction components. The instruction components may include computer program components. The instruction components may include one or more of an authenticating component, a token determination component, a content adjusting component, and/or other instruction components.

The authenticating component may be configured to receive authentication information for a user. The authenticating component may be configured to determine whether the authentication information is valid.

The token determination component may be configured to determine, responsive to determination that the authentication information is valid, a set of one or more digital assets that are associated with an address included in a digital wallet of the user based on transactions recorded on a decentralized ledger such that the user owns the set of the one or more digital assets. The transactions may include the address and the one or more digital assets of the set. The digital wallet may include a private key that provides the user with access to consideration sent to the address. The token determination component may be configured to determine a set of one or more content correlated to the set of the one or more digital assets. The content may be stored in electronic storage.

The content adjusting component may be configured to adjust in-vehicle content based on the one or more digital assets of the set and the correlated set of the one or more content.

DETAILED DESCRIPTION

Figure 1:
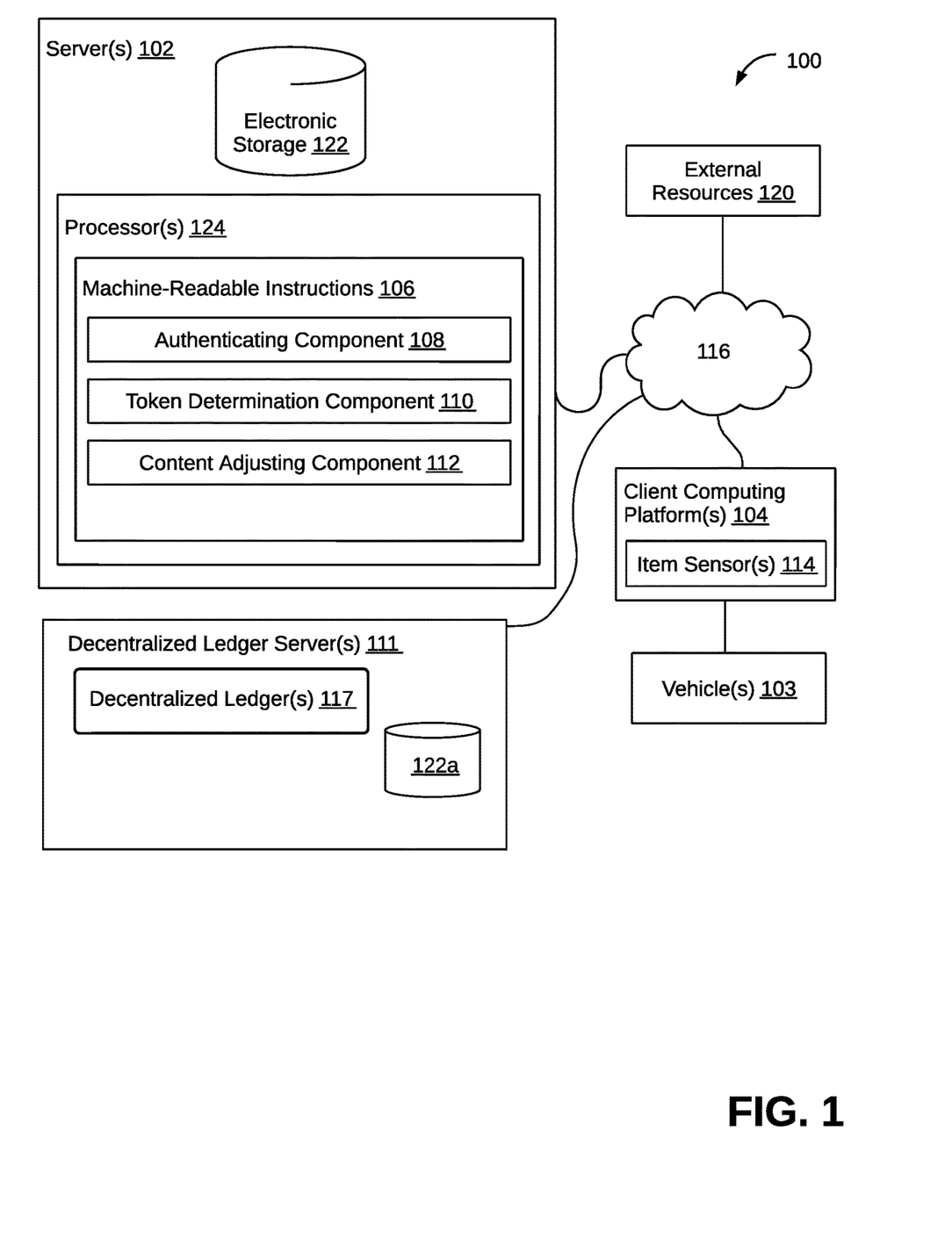
FIG. 1 illustrates a system configured to adjust in-vehicle content based on digital assets, in accordance with one or more implementations.

FIG. 1 illustrates a system 100 configured to adjust in-vehicle content based on digital assets, in accordance with one or more implementations. In some implementations, system 100 may include one or more servers 102, decentralized ledger server(s) 111, one or more item sensors 114, and/or other components. Electronic storage 122a may be similar to electronic storage 122 as described elsewhere in this disclosure, though included in decentralized ledger server(s) 111 as depicted in FIG. 1.

As used herein, the term "digital asset" may refer to a serial code tracked on one or more permanent registries. The digital assets may be uniquely identified and/or uniquely identifiable. As used herein, rights pertaining to digital assets may be tracked, recorded, and/or otherwise registered on one or more permanent registries. As such, an individual digital asset may be a registry-tracked digital asset.

Individual digital assets may be correlated with another entity (which may be referred to as a "correlated entity") by virtue of technology provided and/or supported by the one or more permanent registries on which the rights pertaining to the individual digital assets are tracked (including but not limited to smart contracts and/or other executable code on the one or more permanent registries). Accordingly, rights pertaining to a digital asset may correlate to the provision of one or more rights (e.g., accessibility) with respect to the correlated entity (e.g., control and/or other accessibility). Transactions involving a digital asset recorded on a permanent registry may correlate to certain transactions (or modifications) of the correlated entity, and/or vice versa.

Various types and/or combinations of correlated entities are envisioned within the scope of this disclosure, including but not limited to physical and/or virtual objects, content, items, rights, memberships, grants, etc. The use of the singular "entity" or "correlated entity" is not intended to be limiting, as multiple different objects, content, items, rights, memberships, grants, etc. may be correlated to a single digital asset. By way of non-limiting example, a correlated entity may be a physical item (e.g., artwork, a ticket to an event), a subscription to certain media content, content and so forth. The content may include an image, a video, a graphic image file, a signature of notoriety, a sound bite of an audio file, the audio file, and/or other content. In some implementations, the correlated entity may refer to any item or object related to art and entertainment for which a user may use, own, sell, trade, loan, destroy, and/or otherwise effectuate a change of ownership, access, or control (including exchanges through challenges).

A digital asset may be fungible if it is functionally and/or physically indistinguishable from another digital asset. A digital asset may be non-fungible if it is unique, or one-of-a-kind. For example, a specific individual may be non-fungible. A digital asset may be semi-fungible if there is a set of a limited number of similar but distinguishable digital assets. For example, a limited amount of images of a sports team for a particular year may be semi-fungible. For example, a digital ticket to a show, concert, exhibition, and/or other event may be semi-fungible. The semi-fungible digital assets are considered as unique, "not fungible", or non-fungible digital assets. In some implementations, the digital assets may include non-fungible tokens, fungible tokens, semi-fungible tokens, and/or other digital assets.

Decentralized ledger server(s) 111 may be used to implement one or more decentralized ledger(s) 117. The terms "permanent registries" and "decentralized ledgers" may be used interchangeably herein. In some implementations, one or more decentralized ledger(s) 117 may be decentralized and/or immutable registries. In some implementations, decentralized ledger(s) 117 may be one or more databases on which rights pertaining to the individual digital assets are tracked and/or recorded. In some implementations, decentralized ledger(s) 117 may be maintained by distributed computing platforms (not shown in FIG. 1). In some implementations, a distributed computing platform may be implemented by a set of client computing platforms and/or servers (including, for example, one or more decentralized ledger server(s) 111). In some implementations, client computing platform(s) 104 may be the distributed platform(s). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of decentralized ledger(s) 117. The smart contracts may be stored on decentralized ledger(s) 117 and/or another decentralized ledger. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the decentralized ledger(s) 117 implemented by decentralized ledger server(s) 111 is a private permissioned decentralized ledger. The private permissioned decentralized ledger may be configured to record information and/or track addresses (e.g., corresponding to digital wallets, smart contracts, etc.). The recorded information may pertain to one or more digital assets recorded on decentralized ledger(s) 117. The recorded information may include ownership of the digital assets and/or other assets. For example, ownership rights and/or other rights may be modified. In some implementations, a digital asset may be removed from one decentralized ledger and added or recorded on another decentralized ledger. In some implementations, at least one of the decentralized ledger(s) 117 implemented by decentralized ledger server(s) 111 is a public decentralized ledger. The public decentralized ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of decentralized ledger(s) 117 ledger may be grouped together in units that are referred to as blocks. For example, an individual block may include one or more digital assets (e.g., digital assets) and/or one or more transactions related to the one or more digital assets. For example, an individual block may be linked to one or more other individual blocks. Individual blocks may be linked or chained together to form a structure of blocks and/or a hierarchy of blocks, such as, e.g., a chain of blocks. An individual block may include one or more assets (e.g., digital assets), one or more transactions, and/or other information.

In some implementations, an individual decentralized ledger server(s) 111 may be dedicated to a particular node of a decentralized ledger(s) 117. Typically, different nodes are included in (or implemented by, or hosted by) different servers or different computer systems to increase the safety and security of transactions on a decentralized ledger and/or blockchain. The consensus protocol used for a particular blockchain will be harder to falsify or circumvent when the different nodes are in different geographical locations, on different types of computing platforms, and/or otherwise distributed and diverse.

In some implementations, one or more decentralized ledger(s) 117 implemented by decentralized ledger server(s) 111 may be publicly accessible. In some implementations, one or more decentralized ledger(s) 117 implemented by decentralized ledger server(s) 111 may be private and/or permissioned. In some implementations, one or more decentralized ledger(s) 117 implemented by decentralized ledger server(s) 111 may be append-only. In some implementations, existing blocks and/or nodes of one or more decentralized ledger(s) 117 implemented by decentralized ledger server(s) 111 can substantially not be altered or deleted, unless multiple copies are altered. This is unlikely to happen provided that the multiple copies stored on different computing platforms, e.g., in different geographical locations, in accordance with the relevant consensus protocol(s). Decentralized ledger(s) 117 may be replicated on multiple computing platforms, preferably in multiple different geographical locations. Additionally, individual blocks and/or nodes may be linked together in a manner that prevents tampering, such as using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, individual nodes, transactions, and/or assets may be digitally signed in a manner that proves integrity and/or prevents tampering, e.g., by providing authentication, as well as repudiation.

Server(s) 102 may include electronic storage 122, processor(s) 124, machine-readable instructions 106, and/or other components. In some implementations, server(s) 102, or some of the components thereof, may be included in a vehicle(s) 103. In some implementations, server(s) 102 may be configured to communicate with one or more client computing platforms 104 associated with, connected to, included in, and/or coupled with vehicle(s) 103 according to a client/server architecture and/or other architectures. Client computing platform(s) 104 associated with vehicle(s) 103 may be configured to communicate with other client computing platforms associated with other vehicles via server(s) 102 and/or according to a peer-to-peer architecture and/or other architectures.

The vehicles, including vehicle(s) 103, may include a personal motor vehicle of a user, a motorized scooter, an electric bicycle, a public or private transportation vehicle, a ride/attraction vehicle, and/or other vehicles that users may travel or be seated or standing in. For example, the public or private transportation vehicle may include a bus, a taxi, a tram, a monorail, a train, a subway train, a ferry, an aquatic or aerial gondola, a motorized cart, and/or other public or private transportation vehicles. In some implementations, decentralized ledger server(s) 111 may be configured to communicate with one or more of server(s) 102, client computing platform(s) 104, and/or other entities and/or components, e.g., through one or more network(s) 116.

Server(s) 102 may be configured by machine-readable instructions 106. Machine-readable instructions 106 may include one or more instruction components. The instruction components may include computer program components. The instruction components may include one or more of authenticating component 108, token determination component 110, content adjusting component 112, and/or other instruction components.

Authenticating component 108 may be configured to receive authentication information for a user that facilitates determining validity or invalidity of the identity of the user. The authentication information may facilitate identity verification of the user. The identity verification of the user may facilitate verification of a digital wallet associated with the user. The digital wallet may include a private key, public key, an address generated based on the public key and a hash function, and/or other information. The private key may provide or authorize the user, or anyone who possesses the private key, with access to consideration sent to the address. The private key may authorize and initiate transactions of the consideration from the address. The consideration, by way of non-limiting example, may include currency, cryptocurrency, digital assets, and/or other consideration. The authentication information may include user input entered by the user into client computing platform 104 coupled with or otherwise associated with vehicle(s) 103, output signals based on a physical item associated with the user, biometric information of the user, and/or other authentication information. In some implementations, more than one of the authentication information may be received. In some implementations, one of the authentication information may be received.

The user input may include a passcode, a password, a pass phrase, and/or other user input. In some implementations, the output signals may convey a particular passcode, a particular password, a particular pass phrase, a particular identifier (e.g., a user identification number), and/or other information that facilitates identify verification of the user. In some implementations, the particular passcode, the particular password, and/or the particular pass phrase may be the same as the passcode, the password, and/or the pass phrase received as the user input.

In some implementations, the physical items may be configured to generate primary output signals. By way of non-limiting example, the physical item may include a personal computing platform (e.g., smartphone, tablet, portable computer, etc.), a watch, a fob, a key card, and/or other physical items that include radio frequency identification (RFID) and/or are configured to generate the primary output signals. The output signals received by authenticating component 108 are the primary output signals. In some implementations, such output signals may be received by authenticating component 108 upon the physical item being in close proximity to vehicle(s) 103. Close proximity of the physical item may include within 5 feet, within 3 feet, within 2 inches, and/or other amount of distance.

In some implementations, the output signals received by authenticating component 108 may be generated by item sensor(s) 114. In some implementations, item sensor(s) 114 may be included in or coupled with client computing platform(s) 104. In some implementations, item sensor(s) 114 may be included in or coupled with vehicle(s) 103. Item sensor(s) 114 may be configured to receive the primary output signals from the physical item and generate the output signals based on the primary output signals from the physical item. In some implementations, the primary output signals may be received by item sensor(s) 114 upon the physical item entering vehicle(s) 103 or the physical item being in close proximity of vehicle(s) 103 and/or item sensor(s) 114. In some implementations, the physical item, such as the fob or the watch, may be included within another object. For example, the object may include a toy (e.g., a figurine, a stuffed animal), a wearable accessory (e.g., a headwear piece, a jewelry piece, etc.) and/or other object.

The biometric information may include a fingerprint, a retinal pattern, a hand scan, a face scan, voice, DNA sample, and/or other biometric information. In some implementations, item sensor(s) 114 and/or other sensors may be configured to receive the biometric information from the user. In some implementations, item sensor(s) 114 may be configured to generate secondary output signals representative of the biometric information and transmit the secondary output signals to authenticating component 108. In some implementations, item sensor(s) 114 may be configured to transmit the biometric information to authenticating component 108.

Authenticating component 108 may be configured to determine whether the authentication information is valid or invalid. The authentication information determined as valid may indicate the identity of the user is verified. The authentication information determined as invalid may indicate the identity of the user is unverified. In some implementations, the determination of whether the authentication information is valid or invalid may include comparing the authentication information with access information. The access information may include the passcode, the password, the pass phrase, the particular passcode, the particular password, the particular pass phrase, the biometric information, information identical to the information conveyed by the output signals (e.g., the primary or the secondary output signals), and/or other access information. Comparing the authentication information with the access information may include determining whether the authentication information is the same as the access information, whether a majority of the authentication information is the same as the access information, and/or other techniques to determine whether the authentication information and the access information verify the identity of the user or not.

Token determination component 110 may be configured to determine a set of the one or more digital assets that are associated with the address, included in the digital wallet of the user, based on the transactions recorded on decentralized ledger(s) 117. The determination of the set of the one or more digital assets may be responsive to determination that the authentication information is valid such that the identity of the user is verified. In some implementations, the addresses included in digital wallets may be accessed due to decentralized ledger(s) 117, including the addresses to the wallets, being publicly accessible. In some implementations, the digital wallets may include or may be associated with the authentication information and/or the access information. Thus, the determination of the set of the one or more digital assets may be based on the authentication information that the digital wallet includes and/or comparing the authentication information to the access information that the digital wallet includes. In some implementations, the addresses included in the digital wallets may be accessed based on the authentication information and/or the access information due to decentralized ledger(s) 117 being private and/or permissioned. The digital wallet may further indicate ownership of one or more other digital assets and/or other rights to the one or more digital assets.

Token determination component 110 may be configured to determine a set of one or more content correlated to the set of the one or more digital assets. The content may be stored in electronic storage 122. In some implementations, the content may be stored in electronic storage 122a in addition to or alternative to electronic storage 122. In some implementations, the set of the one or more content correlated to the set of the one or more digital assets may be determined based on the serial codes that are the set of the one or more digital assets.

Content adjusting component 112 may be configured to adjust in-vehicle content based on the one or more digital assets of the set indicated as owned by the user by their digital wallet and the correlated set of the one or more content. That is, upon determination that the user owns/holds a first digital asset correlated to first content and a second digital asset correlated to second content, the in-vehicle content of the vehicle may be adjusted. By way of non-limiting example, the in-vehicle content may include light settings, audio, visual content, a visual theme, scents, temperature, manipulation of suspension system (e.g., hydraulic suspension system, shock absorbers) of vehicle(s) 103, and/or other in-vehicle content. In addition, or alternatively, in some implementations, "in-vehicle content" may be or include digital representations of persons, fictional characters, locations, objects, and identifiers such as brands and logos, for example, which populate a virtual reality (VR), augmented reality (AR), or mixed reality (MR) environment. Moreover, that in-vehicle content may depict virtual worlds that may be experienced by any number of users synchronously and persistently, while providing continuity of user-related information such as personal identity, user history, entitlements, possessions, payments, and the like. It is noted that the concepts disclosed by the present application may also be applied to in-vehicle content that is a hybrid of traditional AV and fully immersive VR/AR/MR experiences, such as interactive video.

The light settings may include light color of individual lights, light brightness of the individual lights, light saturation of individual lights, light projection patterns with a plurality of lights, and/or other lighting settings. The light color may include coloring of lights included in a dashboard, overhead lights, door lights, glove compartment lights, button lights, headlights, door handle lights, under vehicle lights, and/or other lighting included in or on vehicle(s) 103. The light projection patterns may include light strobing, projected visual patterns comprising various shapes and the light colors, and/or other light projection patterns.

The audio may include volume, music, audiobooks, podcasts, essential information (e.g., safety), a voiceover voice, sound effects, and/or other audio. The voiceover voice may convey some of the audio. The voiceover voice may be a voice of a character, an artist (e.g., an actor, a singer), computer generated, and/or other voiceover voices. The sound effects may include sounds emitted upon the user or passengers of vehicle(s) 103 interfacing with vehicle(s) 103 and/or vehicle events. Interfacing with vehicle(s) 103 may include selection of one or more user interface elements in or on vehicle(s) 103, opening a door, closing a door, opening a window, closing a window, locking/unlocking doors and/or windows, and/or other interfacing with vehicle(s) 103 by the users and/or passengers. The user interface elements may include virtual and/or physical user interface elements. The virtual user interface elements may be presented on a graphical user interface included in vehicle(s) 103 such as one or more of text input fields, drop down menus, check boxes, display windows, virtual buttons, and/or other virtual user interface elements. The physical user interface element may include physical buttons, dials, sliders, and/or other physical user interface elements. The vehicle events may include acceleration of vehicle(s) 103, deceleration of vehicle(s) 103, turning on of vehicle(s) 103, turning off of vehicle(s) 103, movement from the suspension system of vehicle(s) 103, gear change of vehicle(s) 103, neglecting removal of objects and/or persons from vehicle(s) 103 (e.g., keys, smartphone, luggage, child passengers, etc.), and/or other vehicle events.

The visual content may include one or more images and/or videos that are presented (e.g., on a display screen, projected). The visual theme, or an overall theme, may be related to a particular character, a movie, an episode, a location, a color scheme, and/or other themes. For example, the visual theme of content presented on the dashboard may include the colors blue, pink, and purple and animated flowers related to a particular character of a particular movie. The scents may be expelled in relation to the overall theme, in response to the vehicle events, and/or in response to the user interfacing with vehicle(s) 103. The temperature may include an interior temperature of vehicle(s) 103, individual seat temperatures, steering wheel temperature, and/or other temperatures. The manipulation of the suspension system of vehicle(s) 103 may include adjusting settings of an air compressor to cause air in an air reservoir to inflate or delate air bags so that a front end, a rear end, left side, and/or right side of vehicle(s) 103 may be raised or lowered, respectively. The manipulation of the suspension system of vehicle(s) 103 may include adjusting settings of a hydraulic compressor to cause a hydraulic liquid to quickly fill a hydraulic actuator, thus causing the front end, the rear end, the left side, and/or the right side of vehicle(s) 103 to spring away. In some implementations, manipulation of the suspension system of vehicle(s) 103 may include locking one or more sides of vehicle(s) 103 at a height that the compressor caused, and subsequently unlocking. In some implementations, the suspension system may be manipulated to coincide with the audio such as music, speech/narration/dialogue (actor, character, etc.), sounds from a ride in which vehicle(s) 103 is included, and/or other information.

In some implementations, adjusting the in-vehicle content may include adding one or more of the in-vehicle content, removing one or more of the in-vehicle content, and/or substituting current or active in-vehicle content with other ones of the in-vehicle content described herein. For example, current in-vehicle content may include music playing, and adjusting the in-vehicle content may include adding the light projection patterns with the plurality of lights, thus adding in-vehicle content. As another example, a first projected image at a given ride attraction may be substituted with a second projected image. As another example, a third projected image may be added alongside the second projected image.

In some implementations, individual ones of the digital assets and their correlated content correspond to one or more adjustments to the in-vehicle content. In some implementations, the adjustment may include adjusting one or more of the in-vehicle content described herein so as to provide or modify a corresponding value to the in-vehicle content. For example, the first digital asset may correspond to adjusting the voiceover voice to a first character's voice and adjusting the sound effects to emit a "boing" sound responsive to the interfacing with vehicle(s) 103. Further, the second digital asset may correspond to adjusting the overhead lighting to pink.

Figure 3:
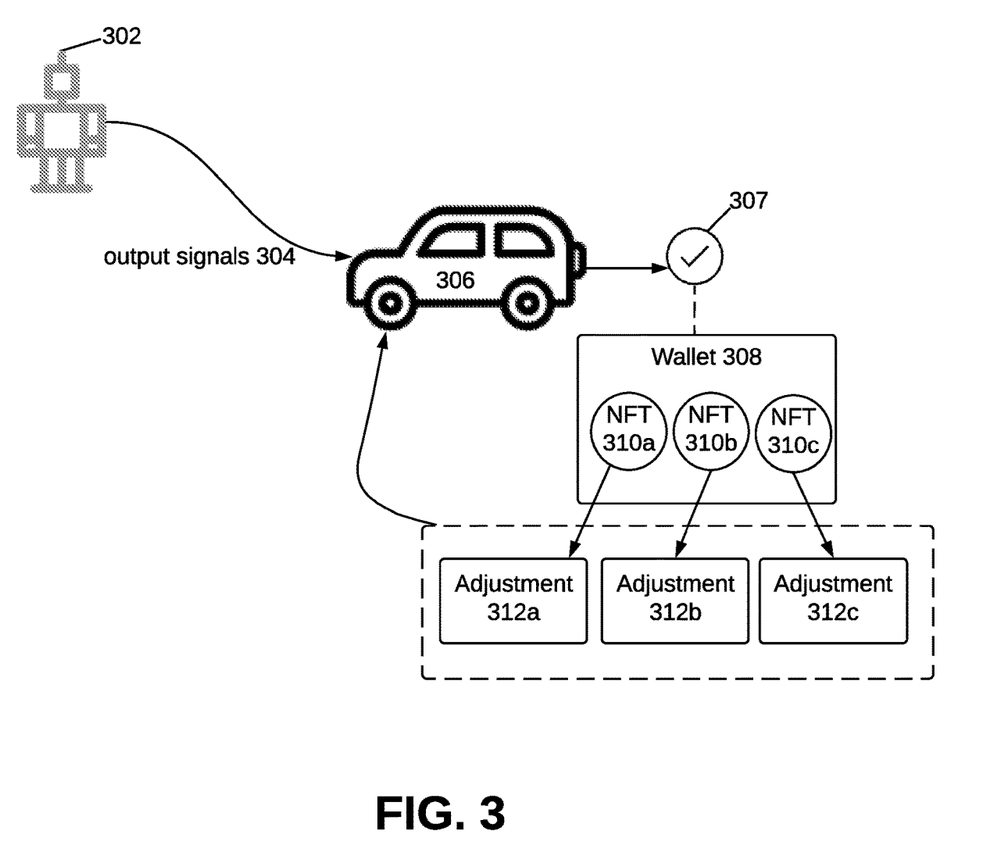
FIG. 3 illustrates an exemplary implementation of the system configured to adjust in-vehicle content based on digital assets.

FIG. 3 illustrates the system configured to adjust in-vehicle content based on digital assets, in accordance with one or more implementations. FIG. 3 illustrates a physical item 302 (e.g., figurine) that may enter vehicle 306. Physical item 302 may be associated or owned by a user (not illustrated). Upon physical item 302 entering or becoming in close proximity to vehicle 306, to a client computing platform associated with vehicle 306, or to an item sensor coupled with vehicle 306, output signals 304 may be received by one or more processors associated with vehicle 306 (e.g., by authenticating component 108 of FIG. 1) as authentication information. Upon determination that the authentication information is valid 307 and thus the identity of the user is verified, a set of non-fungible tokens (NFTs) 310a, 310b, and 310c included in a wallet 308 associated with the user may be determined digital assets. Wallet 308 may correspond to an address tracked on a decentralized ledger (not illustrated, similar to decentralized ledger(s) 117 of FIG. 1) such that the decentralized ledger includes transactions involving the address that indicate ownership by the user. NFTs 310a, 310b, and 310c may be individually associated with in-vehicle adjustments 312a, 312b, and 312c, respectively. Responsive to determining NFTs 310a, 310b, and 310c, and thus adjustments 312a, 312b, and 312c, such adjustments 312a, 312b, and 312c may be effectuated for vehicle 306. For example, adjustment 312a may correspond to adjusting interior lighting of vehicle 306 (e.g., to be a green hue), adjustment 312b may correspond to adjusting sound effects for vehicle events (e.g., acceleration, deceleration) to resemble sounds associated with an object or event (e.g., a rocket ship launching/accelerating or landing/decelerating), and adjustment 312c may correspond to expelling scents (e.g., a scent associated with a freshly baked cookie).

In some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, smart glasses, a gaming console, and/or other computing platforms.

External resources 120 may include sources of information outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, and/or 112, and/or other components. Processor(s) 124 may be configured to execute components 108, 110, and/or 112, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 124 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 124 may be configured to execute one or more additional components that may perform some or all of the functionality attributed below to one of components 108, 110, and/or 112.

Figure 2:
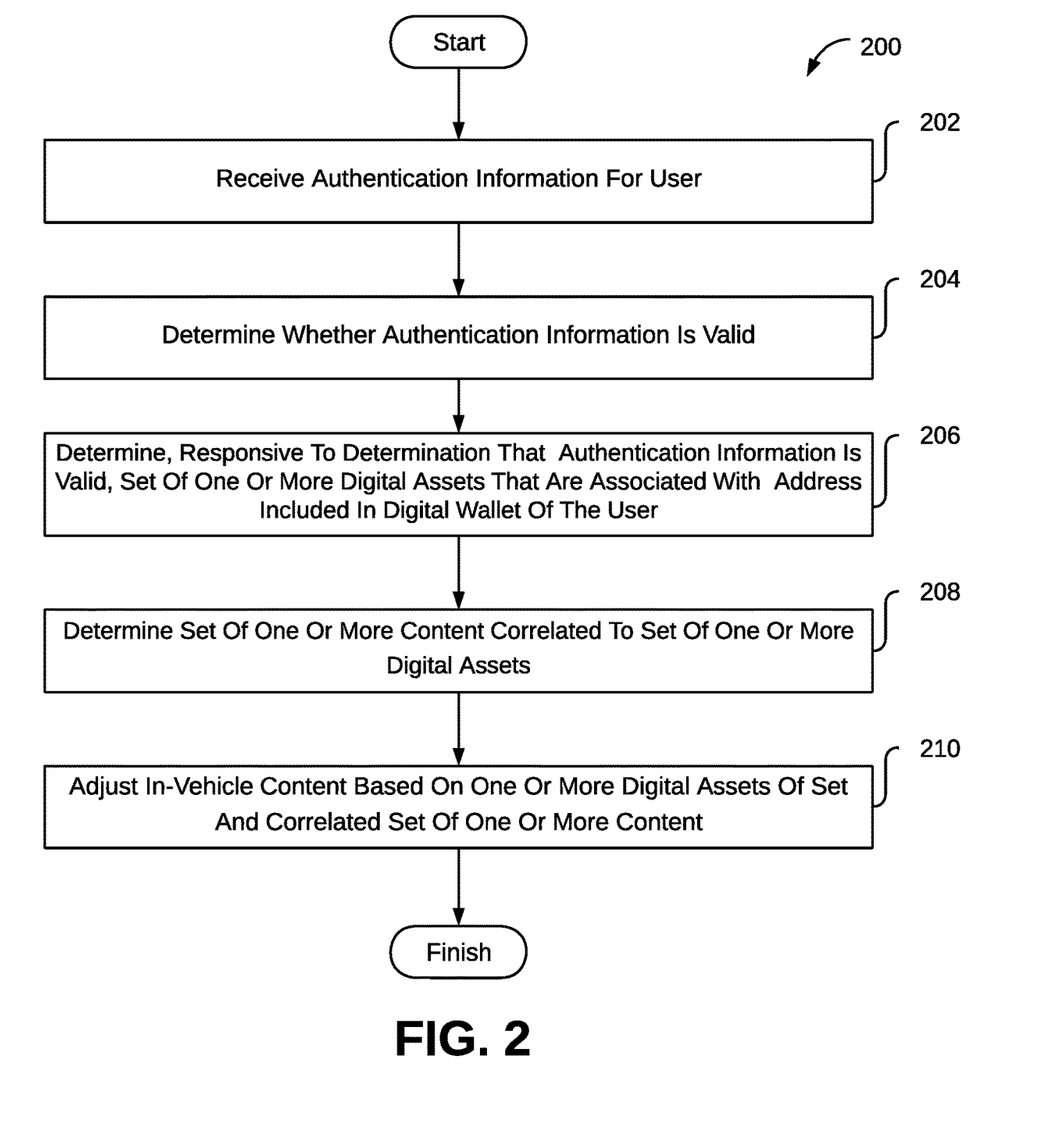
FIG. 2 illustrates a method to adjust in-vehicle content based on digital assets, in accordance with one or more implementations.

FIG. 2 illustrates a method 200 to adjust in-vehicle content based on digital assets, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving authentication information for a user. Operation 202 may be performed by one or more hardware processors configured by machine-readable instructions including a component that is the same as or similar to authenticating component 108, in accordance with one or more implementations.

An operation 204 may include determining whether the authentication information is valid. Operation 204 may be performed by one or more hardware processors configured by machine-readable instructions including a component that is the same as or similar to authenticating component 108, in accordance with one or more implementations.

An operation 206 may include determining, responsive to determination that the authentication information is valid, a set of one or more digital assets that are associated with an address included in a digital wallet of the user based on transactions recorded on a decentralized ledger. Transactions recorded on the decentralized ledger include the address and the one or more digital assets of the set. Operation 206 may be performed by one or more hardware processors configured by machine-readable instructions including a component that is the same as or similar to token determination component 110, in accordance with one or more implementations.

An operation 208 may include determining a set of one or more content correlated to the set of the one or more digital assets, wherein the content is stored in electronic storage. Operation 208 may be performed by one or more hardware processors configured by machine-readable instructions including a component that is the same as or similar to token determination component 110, in accordance with one or more implementations.

An operation 210 may include adjusting in-vehicle content based on the one or more digital assets of the set and the correlated set of the one or more content. Operation 210 may be performed by one or more hardware processors configured by machine-readable instructions including a component that is the same as or similar to content adjusting component 112, in accordance with one or more implementations.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to adjust in-vehicle content based on digital assets, the system comprising:
   electronic storage that stores content correlated with digital assets;
   a decentralized ledger, wherein transactions involving the digital assets are recorded at addresses on the decentralized ledger;
   one or more processors configured by machine-readable instructions to:

receive authentication information for a user, wherein the authentication information is associated with a digital wallet of the user, and wherein the digital wallet includes a private key that provides access to a first set of address on the decentralized ledger;

determine whether the authentication information is valid;

responsive to the determination that the authentication information is valid, analyze the decentralized ledger to identify a set of one or more digital assets involved with transactions recorded at addresses of the first set of addresses on the decentralized ledgers that are accessible by the digital wallet of the user such that the user owns the set of the one or more digital assets involved with the transactions recorded at the addresses of the first set of addresses on the decentralized ledger;

obtain a set of one or more content correlated with the set of the one or more digital assets from the electronic storage; and adjust in-vehicle content based on the one or more digital assets of the set and the correlated set of the one or more content.

2. The system of claim 1, wherein the authentication information includes user input from a client computing platform associated with the user, output signals based on a physical item associated with the user, and/or biometric information of the user.

3. The system of claim 2, wherein the physical item includes the client computing platform, a watch, a fob, and/or a key card.

4. The system of claim 2, further comprising an item sensor configured to generate the output signals based on primary output signals from the physical item.

5. The system of claim 1, wherein the determination of whether the authentication information is valid includes comparing the authentication information with access information.

6. The system of claim 1, wherein the in-vehicle content adjusted includes light settings, audio, settings of a compressor for a suspension system, a visual theme, temperature, and/or scents.

7. The system of claim 1, wherein a plurality of digital assets is identified as owned by the user, and individual ones of the digital assets correspond to an individual adjustment to the in-vehicle content.

8. The system of claim 6, wherein adjusting the in-vehicle content includes adding one or more of the in-vehicle content, removing one or more of the in-vehicle content, and/or substituting current in-vehicle content with other ones of the in-vehicle content.

9. A method to adjust in-vehicle content based on digital assets, the method comprising:

storing content correlated with digital assets, wherein transactions involving the digital assets are recorded at addresses on a decentralized ledger;

receiving authentication information for a user, wherein the authentication information is associated with a digital wallet of the user, and wherein the digital wallet includes a private key that provides access to a first set of address on the decentralized ledger;

determining whether the authentication information is valid;

responsive to determination that the authentication information is valid, analyze the decentralized ledger to identify a set of one or more digital assets involved with transactions recorded at addresses of the first set of addresses on the decentralized ledgers that are accessible by the digital wallet of the user such that the user owns the set of the one or more digital assets involved with the transactions recorded at the addresses of the first set of addresses on the decentralized ledger;

obtaining a set of one or more content correlated with the set of the one or more digital assets from electronic storage; and adjusting in-vehicle content for a vehicle based on the one or more digital assets of the set and the correlated set of the one or more content.

10. The method of claim 9, wherein the authentication information includes user input from a client computing platform associated with the user, output signals based on a physical item associated with the user, and/or biometric information of the user.

11. The method of claim 10, wherein the physical item includes the client computing platform, a watch, a fob, and/or a key card.

12. The method of claim 10, further comprising generating, by item sensors, the output signals based on primary output signals from the physical item.

13. The method of claim 9, wherein the determination of whether the authentication information is valid includes comparing the authentication information with access information.

14. The method of claim 9, wherein the in-vehicle content adjusted includes light settings, audio, settings of a compressor for a suspension system, a visual theme, temperature, and/or scents.

15. The method of claim 9, wherein a plurality of digital assets is identified as owned by the user, and individual ones of the digital assets correspond to an adjustment to the in-vehicle content.

16. The method of claim 14, wherein adjusting the in-vehicle content includes adding one or more of the in-vehicle content, removing one or more of the in-vehicle content, and/or substituting current in-vehicle content with other ones of the in-vehicle content.

* * * * *